United States Patent
Bravi

(10) Patent No.: US 9,509,113 B2
(45) Date of Patent: Nov. 29, 2016

(54) TRANSIENT GAIN CANCELLATION FOR OPTICAL AMPLIFIERS

(71) Applicant: Emilio Bravi, Hillsdale, NJ (US)

(72) Inventor: Emilio Bravi, Hillsdale, NJ (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/306,774

(22) Filed: Jun. 17, 2014

(65) Prior Publication Data

US 2015/0364896 A1    Dec. 17, 2015

(51) Int. Cl.

| | |
|---|---|
| H04B 10/29 | (2013.01) |
| H04B 10/296 | (2013.01) |
| H01S 3/067 | (2006.01) |
| H04J 14/02 | (2006.01) |
| H04B 10/2575 | (2013.01) |
| H01S 3/10 | (2006.01) |
| H01S 3/13 | (2006.01) |
| H01S 3/16 | (2006.01) |

(52) U.S. Cl.
CPC ....... *H01S 3/06754* (2013.01); *H01S 3/10015* (2013.01); *H01S 3/1301* (2013.01); *H04B 10/2575* (2013.01); *H04J 14/0202* (2013.01); *H01S 3/1305* (2013.01); *H01S 3/1306* (2013.01); *H01S 3/1608* (2013.01)

(58) Field of Classification Search
CPC ............ H04J 14/0221; H04J 14/0202; H04B 10/296; H04B 10/2575; H01S 3/06754; H01S 3/1608; H01S 3/10015; H01S 3/1301; H01S 3/1306; H01S 3/1305
USPC ...................................... 398/79–97, 158–161
See application file for complete search history.

(56) References Cited

U.S. PATENT DOCUMENTS

| | | | | |
|---|---|---|---|---|
| 5,166,821 | A * | 11/1992 | Huber | H01S 3/06795 359/238 |
| 5,218,608 | A * | 6/1993 | Aoki | 372/6 |
| 5,506,724 | A * | 4/1996 | Shimizu et al. | 359/341.41 |
| 5,530,583 | A * | 6/1996 | Uno et al. | 359/337.4 |
| 5,706,124 | A * | 1/1998 | Imoto et al. | 359/337.1 |
| 5,719,697 | A * | 2/1998 | Pedersen | 359/341.43 |
| 6,163,399 | A * | 12/2000 | Berg | H04B 10/296 359/337.13 |
| 6,233,092 | B1 * | 5/2001 | Flood | H01S 3/06754 359/337.1 |
| 6,292,288 | B1 * | 9/2001 | Akasaka et al. | 359/334 |
| 6,339,495 | B1 * | 1/2002 | Cowle | H04B 10/296 359/337.1 |
| 6,341,034 | B1 * | 1/2002 | Sun et al. | 359/341.41 |

(Continued)

OTHER PUBLICATIONS

Neto et al., "Enhanced optical gain clamping for upstream packet based traffic on hybrid WDM/TDM-PON using Fiber Bragg grating," Optical Society of America, OCIS codes: (060.4259) Networks, packet-switched, (060.2320) Fiber optics amplifiers and oscillators, (060.2410) Fibers, erbium; 6 pages, 2010.

(Continued)

*Primary Examiner* — Ken N Vanderpuye
*Assistant Examiner* — Dibson Sanchez
(74) *Attorney, Agent, or Firm* — Baker Botts L.L.P.

(57) ABSTRACT

Methods and systems for transient gain cancellation at an optical amplifier may involve generating saturating light that is introduced in a reverse direction to a transmission direction at a doped fiber amplification element. The doped fiber amplification element may amplify an input optical signal having a plurality of wavelengths as well as the saturating light. The saturating light may be regulated by a control circuit to counteract transient gain effects of add/drop events in the input optical signal. The saturated light may be filtered to achieve a desired spectral profile.

17 Claims, 3 Drawing Sheets

(56) References Cited

U.S. PATENT DOCUMENTS

| | | | |
|---|---|---|---|
| 6,353,496 B1* | 3/2002 | Jung | H01S 3/067 359/341.4 |
| 6,356,386 B1* | 3/2002 | Denkin | H04B 10/291 359/337 |
| 6,407,854 B1* | 6/2002 | Shum | 359/341.41 |
| 6,498,677 B1* | 12/2002 | Sun et al. | 359/341.4 |
| 6,519,081 B2* | 2/2003 | Lelic et al. | 359/341.4 |
| 6,704,511 B1* | 3/2004 | Kerfoot, III | H04B 10/296 398/149 |
| 6,738,184 B2* | 5/2004 | Hayashi | H01S 3/06754 359/341.4 |
| 6,798,567 B2* | 9/2004 | Feldman et al. | 359/341.42 |
| 7,444,078 B1* | 10/2008 | Stango et al. | 398/79 |
| 7,526,201 B2* | 4/2009 | Mohs | H04J 14/0221 398/197 |
| 7,796,325 B2* | 9/2010 | Sugaya | 359/334 |
| 7,843,631 B2* | 11/2010 | Onaka | H01S 3/1301 359/341.41 |
| 8,036,526 B2 | 10/2011 | Bogoni | H04B 10/03 398/1 |
| 2001/0015838 A1* | 8/2001 | Iwata et al. | 359/124 |
| 2001/0033413 A1* | 10/2001 | Lelic | H01S 3/06754 359/341.4 |
| 2001/0038482 A1* | 11/2001 | Uehara | 359/161 |
| 2002/0075561 A1* | 6/2002 | Krummrich | 359/334 |
| 2002/0080471 A1* | 6/2002 | Akiyama | H04B 10/296 359/337 |
| 2002/0101652 A1* | 8/2002 | Hayashi | H01S 3/06754 359/341.4 |
| 2004/0080812 A1* | 4/2004 | Sugaya | H04B 10/0775 359/334 |
| 2004/0085621 A1* | 5/2004 | Sekiya | 359/334 |
| 2004/0156095 A1* | 8/2004 | Tsuzaki et al. | 359/334 |
| 2004/0170433 A1* | 9/2004 | Caprino et al. | 398/83 |
| 2004/0174586 A1* | 9/2004 | Nakata | H04B 10/296 359/337 |
| 2004/0240044 A1* | 12/2004 | Park et al. | 359/341.41 |
| 2006/0051093 A1* | 3/2006 | Manna | H04B 10/296 398/79 |
| 2006/0187539 A1* | 8/2006 | Zhou | H01S 3/10007 359/341.4 |
| 2006/0203329 A1* | 9/2006 | Nishihara | H01S 3/06754 359/337 |
| 2007/0058984 A1* | 3/2007 | Charlet | H04J 14/0221 398/160 |
| 2007/0064305 A1* | 3/2007 | Bogoni | H04B 10/275 359/341.41 |
| 2007/0253718 A1* | 11/2007 | Magri | H04B 10/296 398/175 |
| 2007/0258132 A1* | 11/2007 | Zhou | H01S 3/302 359/334 |
| 2008/0025511 A1* | 1/2008 | Fuse | H04K 1/02 380/256 |
| 2008/0130887 A1* | 6/2008 | Harvey | H04B 10/85 380/256 |
| 2008/0131121 A1* | 6/2008 | Magri | H04B 10/27 398/59 |
| 2008/0137179 A1* | 6/2008 | Li et al. | 359/337.13 |
| 2008/0273876 A1* | 11/2008 | Lundquist | H04B 10/296 398/59 |
| 2010/0178052 A1* | 7/2010 | Eggleton | H04B 10/071 398/26 |
| 2011/0141552 A1* | 6/2011 | Ghera | H04B 10/2916 359/334 |
| 2012/0057876 A1* | 3/2012 | Liu | H04B 10/296 398/82 |

OTHER PUBLICATIONS

Kaszubowska-Anandarajah et al., "EDFA Transient Suppression in Optical Burst Switching Systems," ICTON, Mo.B2.4; 4 pages, 2012.

* cited by examiner

TRANSIENT GAIN CANCELLATION FOR OPTICAL AMPLIFIERS

BACKGROUND

Field of the Disclosure

The present disclosure relates generally to optical communication networks and, more particularly, to a system and method for transient gain cancellation for optical amplifiers.

Description of the Related Art

Telecommunication, cable television and data communication systems use optical networks to rapidly convey large amounts of information between remote points. In an optical network, information is conveyed in the form of optical signals through optical fibers. Optical networks may also include various network elements, such as amplifiers, dispersion compensators, multiplexer/demultiplexer filters, wavelength selective switches, optical switches, couplers, etc. configured to perform various operations within the network.

In particular, optical networks may be reconfigured to transmit different individual channels using, for example, optical add-drop multiplexers (OADMs). In this manner, individual channels (e.g., wavelengths) may be added or dropped at various points along an optical network, enabling a variety of network configurations and topologies. However, such network reconfiguration events may result in power transients among the surviving channels. In particular, steady-state gain offset as a result of network reconfiguration may result in undesired variations in signal power and/or optical signal to noise ratio (OSNR) in an optical network.

SUMMARY

In one aspect, a disclosed method for transient gain cancellation in an optical amplifier includes receiving, in a transmission direction, an optical signal having a plurality of wavelengths and amplifying the optical signal at a doped fiber amplification element. The method may include generating saturating light at a broadband source. The saturating light may include at least some of the wavelengths in the optical signal. The method may further include coupling, in a reverse direction to the transmission direction, the saturating light to the doped fiber amplification element. The doped fiber amplification element may amplify both the optical signal and the saturating light.

Additional disclosed aspects for transient gain cancellation in an optical amplifier include an optical amplifier and an optical communication system, as described herein.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
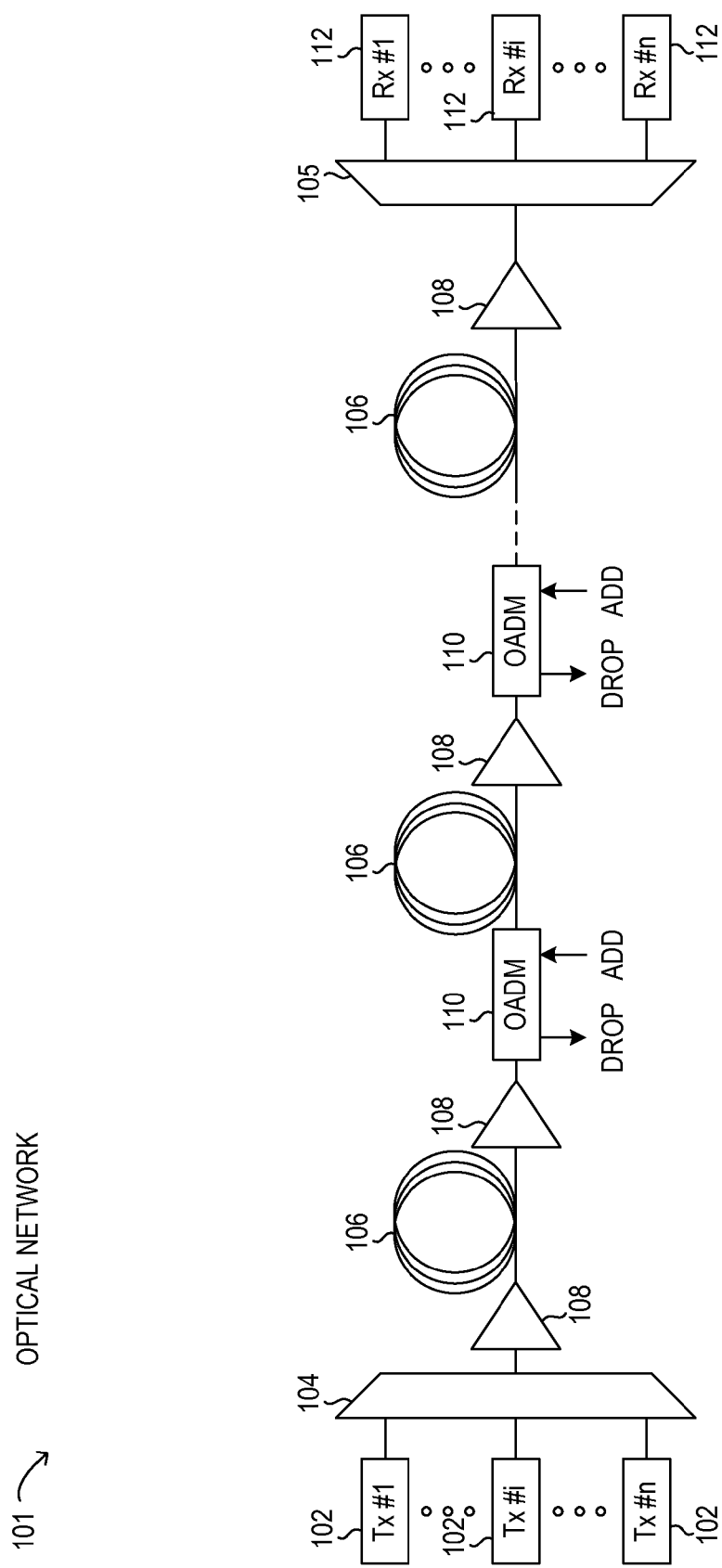
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Turning now to the drawings, FIG. 1 illustrates an example embodiment of optical network 101, which may represent an optical communication system. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical network 101 may include devices configured to transmit optical signals over optical fibers 106. Information may be transmitted and received through optical network 101 by modulation of one or more wavelengths of light to encode the information on the wavelength. In optical networking, a wavelength of light may also be referred to as a channel. Each channel may be configured to carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may be configured to transmit disparate channels using WDM or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before and/or after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device configured to add and/or drop optical signals (i.e., at individual wavelengths) from fibers 106. After passing through an OADM 110, an optical signal may travel along fibers 106 directly to a destination, or the signal may be passed through one or more additional OADMs 110 and/or optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and/or an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and/or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, reconfiguration of the optical signals to add and/or drop individual channels may be performed at OADMs 110. Under such add/drop cases, the surviving channels may systematically be subjected to power transients that result in under gain or over gain. The under or over gain of the surviving channels may accumulate rapidly along cascaded optical amplifiers 108 as this transient gain offset may lead to undesirable variation in output signal power and received OSNR. In particular, as higher bit rates, for example up to 100 gigabits per second, are used for transmission over optical network 101, the received OSNR to achieve such higher bit rates may be reduced due to transient gain (TG) effects. In addition to network throughput, variation in OSNR due to transient gain effects may constrain a transmission distance (i.e., reach) of at least certain portions of optical network 101.

In optical network 101, TG effects may be compensated or minimized dynamically using fast loop control, for example, in optical amplifiers 108. However, TG effects may remain and may not be eliminated by fast loop controls since loop control is performed on the basis of cumulated optical power, while each individual channel may experience different TG because of optical properties of optical amplifiers 108. One method that has been proposed to cancel TG is the use of so-called saturating channels, which are high-power wavelengths that replace a transmitting channel and reduce power excursion at an input of optical amplifier 108, and thereby reduce TG effects as well. However, the use of a saturating channel occupies a transmission channel, and so, reduces a number of channels available for transmission, which may be undesirable due to a negative economic impact on optical network 101. Furthermore, the saturating channel may provide benefits in counteracting the effect of spectral hole burning (SHB) and/or polarization hole burning (PHB) to surviving channels that are within a small portion of the spectrum near the saturating channel. Thus, surviving channels spectrally far from the saturating channel may experience higher TG effects, which is undesirable.

As will be described in further detail herein, the methods and systems disclosed herein for transient gain cancellation in an optical amplifier may involve generating saturating light having a desired spectral shape over a wavelength range corresponding to channels at the optical amplifier. The saturating light may be filtered and may be coupled in a reverse direction to a transmission direction to a doped fiber amplification element in the optical amplifier. The optical power of the saturating light may be adjusted accordingly to the overall optical power of channels at the optical amplifier. When add or drop events are experienced at an input of the optical amplifier, the optical power of the saturating light may be adjusted in real time accordingly to counteract the overall power variation experienced at the optical amplifier, thereby reducing TG effects. The methods for using saturating light to counteract TG effects, as described herein, in optical amplifiers may be implemented without reducing a number of channels transmitted by an optical amplifier. Furthermore, the methods for transient gain cancellation using saturating light, as described herein, may further reduce the impact of SHB and/or PHB for all the surviving channels, irrespective of a spectral position of a surviving channel. Additionally, methods of coupling the saturating light in a reverse direction to a transmission direction, as described herein, may prevent interference between the saturating light and the channels.

Figure 2:
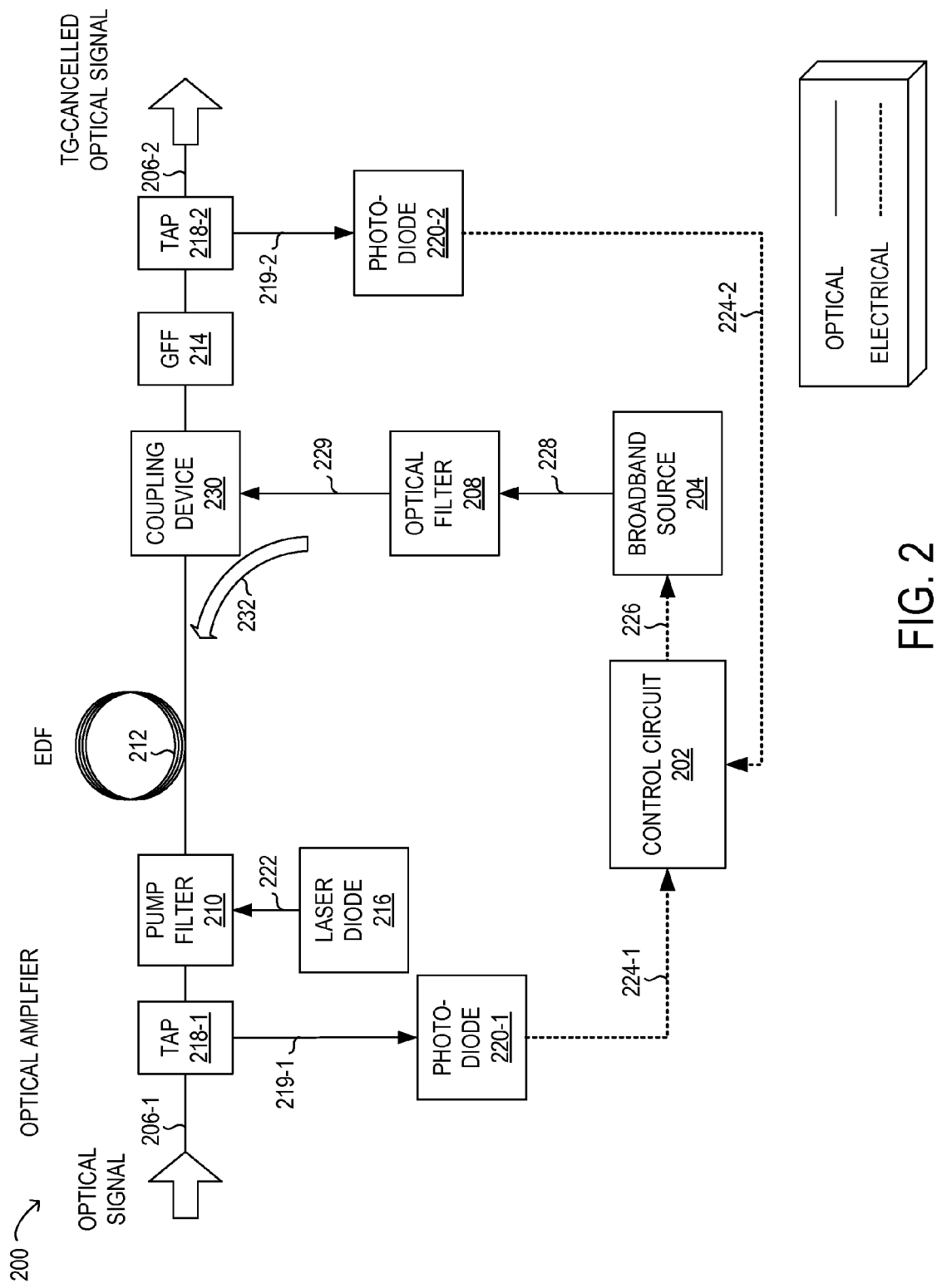
FIG. 2 is a block diagram of selected elements of an embodiment of an optical amplifier.

Turning now to FIG. 2, an example embodiment of optical amplifier 200 employing transient gain cancellation using saturating light control is illustrated in block diagram format. As shown, optical amplifier 200 may represent an embodiment of optical amplifier 108 (see FIG. 1) and may include control circuit 202 and broadband source 204. Accordingly, optical amplifier 200 may receive optical signal 206-1 as input and may output TG-cancelled optical signal 206-2, as will be described in further detail. In particular, optical amplifier 200 may be used in optical network 101 after an instance of OADMs 110 is used to add and/or drop channels, which may represent a source of TG in optical signal 206. In FIG. 2, optical amplifier 200 is shown including various optical taps 218, which may represent any of a variety of optical splitters for performing measurements on optical signal 206 at various points within optical amplifier 200, as will be described in further detail. As shown in FIG. 2, optical amplifier 200 may represent a device comprising various components and signals between the components, which may include signals in the optical domain (shown connected with a solid line) as well as signals in the electrical domain (shown connected with a dashed line). It is noted that arrows depicted in signal lines in FIG. 2 are intended to show information flow and may not necessarily represent a direction of transmission of a corresponding signal media (e.g., transmission of an optical signal or an electrical current).

In FIG. 2, optical amplifier 200 may include optical tap 218-1 for measuring optical signal 206-1 arriving as an input to optical amplifier 200. Optical signal 219-1 output from optical tap 218-1 may be provided to photodiode 220-1, which may output first control input 224-1 representing input power of optical signal 206-1.

Also shown in optical amplifier 200 is generation of pump signal 222, which may be combined with optical signal 206-1 passing through optical tap 218-1 at pump filter 210 and may thus be fed to a doped fiber amplification element (shown in the exemplary embodiment of FIG. 2 as erbium-doped fiber (EDF) 212, which may then amplify optical signal 206-1. After amplification by EDF 212 and filtering by gain flattening filter (GFF) 214, optical signal 206-2, which passes through optical tap 218-2, may represent the amplified signal output by EDF 212. It is noted that in different embodiments, other types of doped fiber amplification elements may be used in place of EDF 212.

In FIG. 2, upon receiving first control input 224-1 output from photodiode 220-1, control circuit 202 may generate regulating signal 226 for regulating power intensity at broadband source 204. In various embodiments, broadband source 204 may be a light-emitting diode (LED) source. Broadband source 204 may generate unfiltered saturating light 228, which may pass through optical filter 208 to generate filtered saturating light 229. In given embodiments, broadband source 204 and/or optical filter 208 may output light that exhibits a spectrum corresponding to at least some of the wavelengths in optical signal 206-1. For example, optical filter 208 may filter unfiltered saturating light 228 to generate a desired spectral profile of filtered saturating light 229. Optical filter 208 may operate in environments with a fixed optical grid or with flex-grid channel spacing. In optical communications, a 'C-band' refers to the wavelength range 1530-1565 nm, which corresponds to the amplification range of EDF 212. Because TG effects experienced by surviving channels may be stronger in a lower part of the C-band, for example at the wavelength range 1528-1540 nm, in particular embodiments, optical filter 208 may be shaped to output higher optical power in the lower part of the C-band. In embodiments where other types of doped fiber amplification elements are used, different wavelength bands may be emphasized by optical filter 208, as desired. It is noted that in some embodiments, optical filter 208 may be omitted.

Furthermore, in optical amplifier 200 shown in FIG. 2, optical signal 219-2 may be output from optical tap 218-2 and may be provided to photodiode 220-2, which may output second control input 224-2 representing output power of optical signal 206-2. In certain embodiments, control circuit 202 may receive second control input 224-2 for the purposes of regulating broadband source 204. It is noted that in some embodiments, second control input 224-2 may be omitted.

As shown in FIG. 2, filtered saturating light 229 may be fed to coupling device 230, which may then output light towards EDF 212, as shown by arrow 232, in a reverse direction to the transmission direction of optical amplifier 200. When optical filter 208 is not used (not shown in FIG. 2), coupling element 230 may receive and output unfiltered saturating light 228. In particular embodiments, coupling device 230 may be an optical circulator.

In operation of optical amplifier 200 shown in FIG. 2, control circuit 202 may regulate a power intensity of broadband source 204 using regulating signal 226. Control circuit 202 may respond to changes in input optical signal 206-1 and/or output optical signal 206-2, such as resulting from add or drop events, to control regulating signal 226, and so, broadband source 204. In this manner, saturating light to counteract TG effects in EDF 212 may be generated and may maintain a relatively constant power level for the wavelengths in optical signal 206 and/or substantially eliminate power variants in optical signal 206. The TG cancellation using counter propagating saturating light at EDF 212 may limit bit error rate (BER) deterioration in optical networks using ROADMs by instantaneously maintaining relatively constant optical power at optical amplifier 200.

Figure 3:
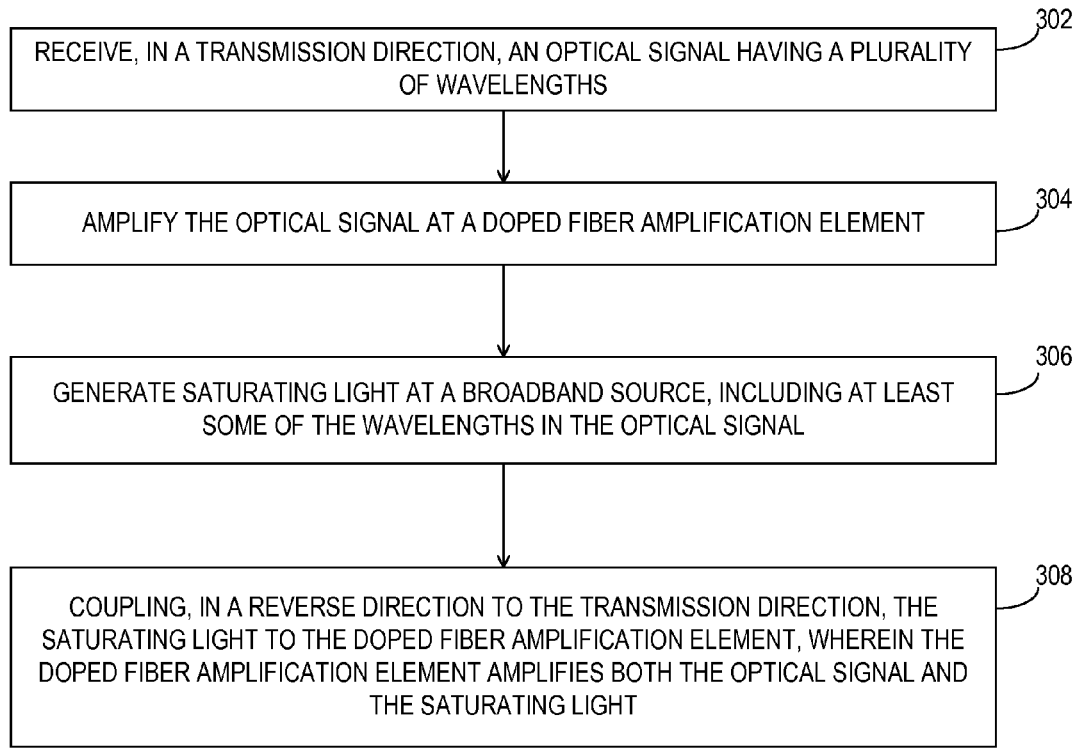
FIG. 3 is a flow diagram of selected elements of an embodiment of a method for transient gain cancellation using an optical amplifier.

Referring now to FIG. 3, a block diagram of selected elements of an embodiment of method 300 for TG cancellation is depicted in flowchart form. Method 300 may be performed using network 101 (see FIG. 1) and optical amplifier 200 (see FIG. 2). It is noted that certain operations described in method 300 may be optional or may be rearranged in different embodiments.

Method 300 may begin by receiving (operation 302), in a transmission direction, an optical signal having a plurality of wavelengths. The optical signal may be amplified (operation 304) at a doped fiber amplification element. Saturating light may be generated (operation 306) at a broadband source, including at least some of the wavelengths in the optical signal. The saturating light may be coupled (operation 308), in a reverse direction to the transmission direction, to the doped fiber amplification element, wherein the doped fiber amplification element amplifies both the optical signal and the saturating light.

As disclosed herein, methods and systems for transient gain cancellation at an optical amplifier may involve generating saturating light that is introduced in a reverse direction to a transmission direction at a doped fiber amplification element. The doped fiber amplification element may amplify an input optical signal having a plurality of wavelengths as well as the saturating light. The saturating light may be regulated by a control circuit to counteract transient gain effects of add/drop events in the input optical signal. The saturated light may be filtered to achieve a desired spectral profile.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for transient gain cancellation at an optical amplifier, comprising:
    receiving, in a transmission direction, an optical signal having a plurality of wavelengths;
    generating a first electrical signal corresponding to the received optical signal;
    amplifying the optical signal at a doped fiber amplification element;
    generating saturating light at a broadband source, wherein the saturating light includes at least some of the wavelengths in the optical signal;
    regulating an optical power level of the broadband source based on the first electrical signal; and
    coupling, in a reverse direction to the transmission direction, the saturating light to the doped fiber amplification element, wherein the doped fiber amplification element amplifies both the optical signal and the saturating light.

2. The method of claim 1, wherein generating the saturating light further comprises:
    generating a second electrical signal corresponding to an output optical signal of the optical amplifier, and
    wherein the regulating the optical power level of the broadband source is based on the first electrical signal and the second electrical signal.

3. The method of claim 1, wherein regulating the optical power level of the broadband source further comprises:
    responsive to an add/drop of at least some of the wavelengths in the optical signal, modifying the optical power level of the broadband source to reduce an overall optical power variation at the doped fiber amplification element.

4. The method of claim 1, wherein generating the saturating light further comprises:
    filtering, at an optical filter, the saturating light from the broadband source to generate filtered saturating light, wherein the filtered saturating light has a desired spectral profile; and
    coupling the filtered saturating light to the doped fiber amplification element.

5. The method of claim 4, wherein the desired spectral profile corresponds to a spectrum of at least some of the wavelengths in the optical signal.

6. The method of claim 4, wherein the doped fiber amplification element is erbium doped, and wherein the desired spectral profile has relatively higher power at a wavelength band between 1528 nm to 1540 nm.

7. The optical amplifier of claim 1, wherein the control circuit is to:
    modify the optical power level of the broadband source to reduce an overall optical power variation at the doped fiber amplification element.

8. The optical amplifier of claim 7, wherein the control circuit modifies the optical power level of the broadband source responsive to an add/drop of at least some of the wavelengths in the optical signal.

9. The optical communication system of claim 1, wherein the control circuit is to:
modify the optical power level of the broadband source to reduce an overall optical power variation at the doped fiber amplification element.

10. The optical communication system of claim 9, wherein the control circuit modifies the optical power level of the broadband source responsive to an add/drop of at least some of the wavelengths in the optical signal at the optical add-drop multiplexer.

11. An optical amplifier for receiving an optical signal having a plurality of wavelengths and performing transient gain cancellation, comprising:
a doped fiber amplification element to receive, in a transmission direction, the optical signal;
a broadband source for generating saturating light, wherein the saturating light includes at least some of the wavelengths in the optical signal;
a control circuit to regulate an optical power of the broadband source, the control circuit to be responsive to at least one of:
a first electrical signal corresponding to the received optical signal; and
a second electrical signal corresponding to an output optical signal of the optical amplifier; and
a coupling device to couple, in a reverse direction to the transmission direction, the saturating light to the doped fiber amplification element, wherein the doped fiber amplification element amplifies both the optical signal and the saturating light.

12. The optical amplifier of claim 11, further comprising:
an optical filter disposed between the broadband source and the coupling element, the optical filter to filter the saturating light from the broadband source and generate filtered saturating light having a desired spectral profile.

13. The optical amplifier of claim 12, wherein the desired spectral profile corresponds to a spectrum of at least some of the wavelengths in the optical signal.

14. The optical amplifier of claim 12, wherein the doped fiber amplification element is erbium doped, and wherein the desired spectral profile has relatively higher power at a wavelength band between 1528 nm to 1540 nm.

15. An optical communication system comprising:
a transmitter to transmit an optical signal over an optical signal transmission path;
a receiver to receive the optical signal from the optical signal transmission path;
an optical add-drop multiplexer in the optical signal transmission path; and
an optical amplifier for performing transient gain cancellation, the optical amplifier to receive the optical signal from the optical add-drop multiplexer, the optical amplifier further comprising:
a doped fiber amplification element to receive, in a transmission direction, the optical signal;
a broadband source for generating saturating light, wherein the saturating light includes at least some of the wavelengths in the optical signal;
a control circuit to regulate an optical power of the broadband source, the control circuit to be responsive to at least one of:
a first electrical signal corresponding to the received optical signal; and
a second electrical signal corresponding to an output optical signal of the optical amplifier; and
a coupling device to couple, in a reverse direction to the transmission direction, the saturating light to the doped fiber amplification element, wherein the doped fiber amplification element amplifies both the optical signal and the saturating light.

16. The optical communication system of claim 15, further comprising:
an optical filter disposed between the broadband source and the coupling element, the optical filter to filter the saturating light from the broadband source and generate filtered saturating light having a desired spectral profile, wherein the desired spectral profile corresponds to a spectrum of at least some of the wavelengths in the optical signal.

17. The optical communication system of claim 16, wherein the doped fiber amplification element is erbium doped, and wherein the desired spectral profile has relatively higher power at a wavelength band between 1528 nm to 1540 nm.

* * * * *